United States Patent
Kim et al.

(10) Patent No.: US 10,738,140 B2
(45) Date of Patent: Aug. 11, 2020

(54) POLYETHYLENE, METHOD FOR PREPARING THE SAME AND SEPARATOR USING THE SAME

(71) Applicant: LOTTE CHEMICAL CORPORATION, Seoul (KR)

(72) Inventors: Kyung Hoon Kim, Daejeon (KR); Jung Ju Yoon, Daejeon (KR); Dong Hoon Lee, Daejeon (KR)

(73) Assignee: LOTTE CHEMICAL CORPORATION, Seoul (KR)

( * ) Notice: Subject to any disclaimer, the term of this patent is extended or adjusted under 35 U.S.C. 154(b) by 0 days.

(21) Appl. No.: 16/201,651

(22) Filed: Nov. 27, 2018

(65) Prior Publication Data
US 2019/0161564 A1 May 30, 2019

(30) Foreign Application Priority Data
Nov. 29, 2017 (KR) .................. 10-2017-0161605

(51) Int. Cl.
*C08F 110/02* (2006.01)
*H01M 2/16* (2006.01)
*C08F 4/02* (2006.01)

(52) U.S. Cl.
CPC ........... *C08F 110/02* (2013.01); *C08F 4/022* (2013.01); *H01M 2/1653* (2013.01); *C08F 2500/01* (2013.01); *C08F 2500/12* (2013.01)

(58) Field of Classification Search
CPC ...... C08F 4/022; C08F 110/02; H01M 2/1653
USPC ....................................................... 429/144
See application file for complete search history.

(56) References Cited

U.S. PATENT DOCUMENTS

| | | | |
|---|---|---|---|
| 4,987,025 A | 1/1991 | Shiraki et al. | |
| 7,504,463 B2 | 3/2009 | Cann et al. | |
| 7,714,072 B2 | 5/2010 | Michie, Jr. et al. | |
| 9,676,877 B2 | 6/2017 | Hjertberg et al. | |
| 2015/0017365 A1* | 1/2015 | Sohn | C08F 10/02 428/36.9 |
| 2015/0159002 A1* | 6/2015 | Cermelli | C08L 23/06 525/240 |
| 2016/0177073 A1* | 6/2016 | Demirors | C08L 23/06 428/220 |

FOREIGN PATENT DOCUMENTS

| | | |
|---|---|---|
| JP | S60-158205 A | 8/1985 |
| JP | 2003-212918 A | 7/2003 |

(Continued)

OTHER PUBLICATIONS

Office action in corresponding Japan Patent Application No. 2018-220834, Office action dated Nov. 22, 2019 (4 pgs.).

(Continued)

*Primary Examiner* — James M Erwin
(74) *Attorney, Agent, or Firm* — Lewis Roca Rothgerber Christie LLP

(57) ABSTRACT

Disclosed herein is a polyethylene. The polyethylene has a melt flow index of about 0.4 g/10 min to about 0.6 g/10 min, a weight average molecular weight of about 500,000 g/mol to about 700,000 g/mol, and a molecular weight distribution of about 3 to about 5 and is prepared by polymerization in the presence of a catalyst retaining at least about 50% of an initial reactivity level (during initial 30 minutes) for a period of time exceeding about 4 hours.

8 Claims, 1 Drawing Sheet

(56) References Cited

FOREIGN PATENT DOCUMENTS

| | | |
|---|---|---|
| JP | 2005-225919 A | 8/2005 |
| JP | 2010-235926 A | 10/2010 |
| JP | 2013-514389 A | 4/2013 |
| JP | 2013-227539 A | 11/2013 |
| JP | 2017-103205 A | 6/2017 |
| KR | 10-2017-0054104 | 5/2017 |

OTHER PUBLICATIONS

Oka, et al., "Lecture of Plastic Materials [4], Polyethylene resin," Japan, Nikkan Kogyo Shimbun, p. 50, Aug. 30, 1969, 4 pgs. (Abstract, partial translation).

Spalding, Mark A., et al., "Handbook of Industrial Polyethylene and Technology: Definitive Guide to Manufacturing, Properties, Processing, Applications and Markets," 2017, John Wiley & Sons, Inc. and Scrivener Publishing LLC, p. 252.

* cited by examiner

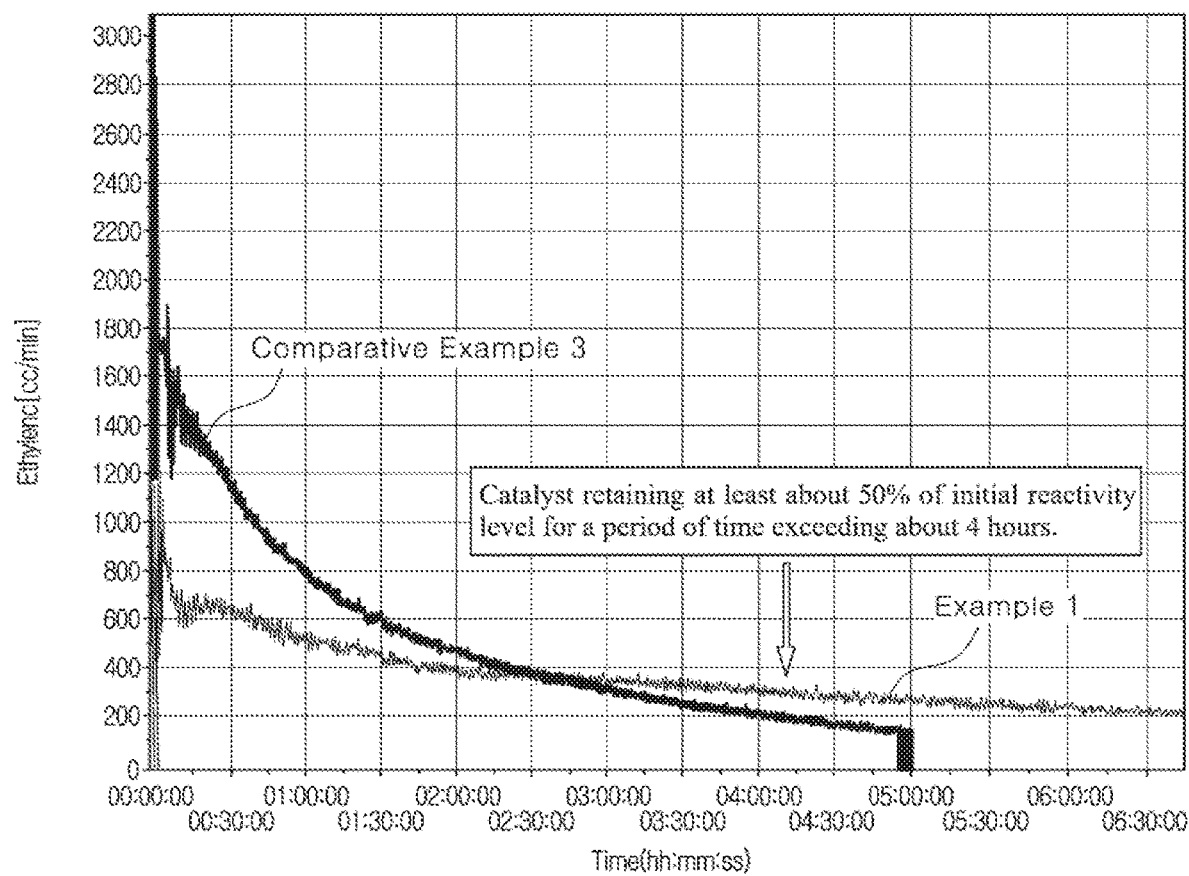

POLYETHYLENE, METHOD FOR PREPARING THE SAME AND SEPARATOR USING THE SAME

CROSS-REFERENCE TO RELATED APPLICATION

This application claims the benefit of Korean Patent Application No. 10-2017-0161605, filed on Nov. 29, 2017 in the Korean Intellectual Property Office, the entire disclosure of which is incorporated herein by reference.

FIELD OF THE INVENTION

The present invention relates to a polyethylene, a method of preparing the same, and a separator membrane using the same. More particularly, the present invention relates to a polyethylene which has a high molecular weight, a narrow molecular weight distribution, a small average particle diameter, and a high crystal relaxation rate, thereby exhibiting good mechanical properties, uniform processability, and good shutdown properties, and thus is suitable for use as a separator membrane, a method of preparing the same, and a separator membrane using the same.

DESCRIPTION OF THE RELATED ART

Recently, with increase in demand for secondary batteries, demand for separator membranes used in the batteries has been rapidly increasing. As a separator membrane, polyolefin resins, which are economically feasible and have high functionality, are most widely used. Particularly, polyethylene has good shutdown characteristics and thus can secure stability, which is important for practical use. Polyethylene used in this field is provided as a thin film-shaped molded article and thus needs to have a very high molecular weight. In addition, the polyethylene needs to have good mechanical properties despite having a thin film shape and needs to have a small and uniform particle size when molded. In other words, polyethylene for a separator membrane needs to have a high molecular weight, a narrow molecular weight distribution, and a small average particle size without affecting processability.

As a polyethylene resin for separator membranes, a polyethylene resin having an average molecular weight of more than 1,000,000 has been developed in the art. However, since this polyethylene resin exhibits poor processability due to an excessively high molecular weight, despite advantages of high abrasion resistance, high impact resistance, high weather resistance, high chemical resistance, and high dimensional stability, there is a limit to use the polyethylene resin as a material for separator membranes.

Therefore, there is a need for a polyethylene with a high molecular weight, a narrow molecular weight distribution and a small average particle diameter without reduction in processability.

One example of the background technique is disclosed in Korean Patent Publication No. 2017-0054104.

SUMMARY OF THE INVENTION

It is one aspect of the present invention to provide a polyethylene which has a high molecular weight, a narrow molecular weight distribution, a small average particle diameter, and a high crystal relaxation rate, and a method of preparing the same.

It is another aspect of the present invention to provide a polyethylene which exhibits good mechanical properties, uniform processability, and good shutdown properties and thus is suitable for use in molding a separator membrane, and a method of preparing the same.

It is a further aspect of the present invention to provide a polyethylene suitable for use as a separator membrane for lithium ion batteries, a method of preparing the same, and a separator membrane using the same.

It is yet another aspect of the present invention to provide a separator membrane including the polyethylene set forth above.

In accordance with one aspect of the present invention, there is provided a polyethylene. The polyethylene has a melt flow index of about 0.4 g/10 min to about 0.6 g/10 min, a weight average molecular weight of about 500,000 g/mol to about 700,000 g/mol and a molecular weight distribution of about 3 to about 5, and is prepared by polymerization in the presence of a catalyst retaining at least about 50% of an initial reactivity level (during the initial 30 minutes) for a period of time exceeding about 4 hours.

In one embodiment, the catalyst may be a Ziegler-Natta catalyst in which a titanium compound is supported on a magnesium support.

In one embodiment, the polyethylene may have a melting transition heat capacity of about 180 J/g or less, as measured by differential scanning calorimetry, and an average particle diameter of about 80 μm to about 180 μm.

In one embodiment, the polyethylene may have a molecular weight distribution of about 3 to about 4.

In accordance with another aspect of the present invention, there is provided a method of preparing the polyethylene set forth above. The method includes polymerizing ethylene in the presence of a catalyst retaining at least about 50% of an initial reactivity level (during the initial 30 minutes) for a period of time exceeding about 4 hours.

In one embodiment, a molecular weight of the polyethylene may be controlled by adjusting an input of hydrogen in the range of about 350 ppm to about 800 ppm.

In accordance with a further aspect of the present invention, there is provided a separator membrane including the polyethylene set forth above.

In one embodiment, the membrane may be a membrane for lithium ion batteries.

The present invention provides a polyethylene which has a high molecular weight, a narrow molecular weight distribution, a small average particle diameter, and a high crystal relaxation rate, thereby exhibiting good mechanical properties, uniform processability, and good shutdown properties, and thus is suitable for use in molding a separator membrane, a method of preparing the same, and a separator membrane using the same.

BRIEF DESCRIPTION OF DRAWINGS

FIG. 1 is a graph showing results of evaluation of reactivity of catalysts used in Example 1 and Comparative Example 3.

DETAILED DESCRIPTION OF THE INVENTION

Hereinafter, embodiments of the present invention will be described in detail.

A catalyst used in preparation of a polyethylene according to the present invention retains at least about 50% of an initial reactivity level (during initial 30 minutes of catalytic reaction) for a period of time exceeding about 4 hours. Here, evaluation of reactivity of the catalyst may be carried out by measuring change in amount of ethylene used in polymerization when using 10 mg of the catalyst under conditions of a temperature of 80° C., a pressure of 7 bar, and a hydrogen pressure of 2.2 bar.

A polyethylene prepared using a catalyst retaining at least about 50% of an initial reactivity level (during initial 30 minutes of catalytic reaction) for a period of time less than or equal to about 4 hours has a disadvantage of reduction in uniformity, despite a wide distribution of molecular weights and thus good processability. In one embodiment, the catalyst according to the present invention may be a Ziegler-Natta catalyst in which a titanium compound is supported on a magnesium support.

In one embodiment, the catalyst may be prepared by adding a titanium compound dropwise to an organic carboxylic acid ester-containing magnesium compound to form a seed, heating the seed to form catalyst particles, and aging the catalyst particles at a temperature of about 70° C. to about 85° C.

Examples of the titanium compound may include 4-halogenated titanium such as $TiCl_4$, $TiBr_4$ and $TiI_4$, 3-halogenated alkoxy titanium such as $Ti(OCH_3)Cl_3$, $Ti(On-C_4H_9)Cl_3$, and $Ti(OCH_5)Br_3$, 2-halogenated 2-alkoxy titanium such as $Ti(OCH_3)_2Cl_2$, $Ti(OC_2H_5)_2Cl_2$, and $Ti(OC_2H_2)_2Br_2$, 1-halogenated 3-alkoxy titanium such as $Ti(OCH_3)_3Cl$, $Ti(OC_2H_5)_3Cl$, $Ti(On-C_4H_9)_3Cl$, and $Ti(OC_2H_5)_3Br$, and 4-alkoxy titanium such as $Ti(OCH_3)_4$, $Ti(OC_2H_5)_4$, and $Ti(On-C_4H_9)_4$. Particularly, 4-halogenated titanium is preferred.

A hydrocarbon solvent used as an admixture for controlling the concentration of the titanium compound is an inert solvent having no reactivity with the titanium compound. Examples of the hydrocarbon solvent may include aliphatic hydrocarbons, such as pentane, hexane, heptane, octane, decane, dodecane and kerosene; alicyclic hydrocarbons, such as cyclopentane, methylcyclopentane, cyclohexane, methylcyclohexane and cyclooctane; and aromatic hydrocarbons, such as benzene, toluene, xylene, ethylbenzene, cumene, and cymene.

The organic carboxylic acid ester-containing magnesium compound, in which the organic carboxylic acid ester acts as an electron donor, may be obtained by reacting a magnesium compound with an organic carboxylic acid ester in an appropriate hydrocarbon solvent. Alternatively, the organic carboxylic acid ester-containing magnesium compound may be prepared by dissolving a magnesium compound in an appropriate solubilizer, followed by treatment with an organic carboxylic acid ester, in order to obtain a catalyst having a uniform particle diameter. Examples of the magnesium compound may include: magnesium halides such as magnesium chloride, magnesium bromide, magnesium iodide and magnesium fluoride; alkoxy magnesium such as ethoxy magnesium, isopropyl magnesium, butoxy magnesium, and octoxy magnesium; alkoxy magnesium chlorides, such as methoxy magnesium chloride and ethoxy magnesium chloride; aryloxy magnesium, such as phenoxy magnesium and methylphenoxy magnesium; and aryloxy magnesium chlorides, such as phenoxy magnesium chloride and methylphenoxy magnesium chloride. These may be used alone or as a mixture thereof. Particularly, a magnesium halide is preferred as the magnesium compound.

In reaction of the magnesium compound with the organic carboxylic acid ester, the reaction temperature may be about 50° C. or higher, preferably about 70° C. to about 200° C., although the reaction temperature may vary depending on the kind of hydrocarbon solvent used. In addition, the reaction time may range from about 10 minutes to about 5 hours, preferably from about 30 minutes to about 3 hours. Further, the molar ratio of the magnesium compound to the organic carboxylic acid ester may range from about 1:0.01 to about 1:1, preferably about 1:0.05 to about 1:0.5. When the magnesium compound is dissolved in an appropriate solubilizer, the particle diameter of a finally obtained solid catalyst may vary slightly depending on the kind of organic carboxylic acid ester.

Examples of the organic carboxylic acid ester may include methyl formate, methyl acetate, ethyl acetate, vinyl acetate, propyl acetate, isobutyl acetate, t-butyl acetate, octyl acetate, cyclohexyl acetate, ethyl propionate, methyl butyrate, ethyl valerate, ethyl pyruvate, ethyl pivalate, methyl chloroacetate, ethyl dichloroacetate, methyl methacrylate, ethyl crotonate, methyl cyclohexyl carboxylate, methyl benzoate, ethyl benzoate, propyl benzoate, butyl benzoate, octyl benzoate, cyclohexyl benzoate, phenyl benzoate, methyl anisate, ethyl anisate, ethyl ethoxy benzoate, monomethyl phthalate, monoethyl phthalate, dimethyl phthalate, methylethyl phthalate, monoisobutyl phthalate, diethyl phthalate, ethylisobutyl phthalate, di-n-propyl phthalate, diisopropyl phthalate, di-n-butyl phthalate, dibutyl phthalate, di-n-heptyl phthalate, di-n-ethylhexyl phthalate, di-n-octyl phthalate, dineopentyl phthalate, dodecyl phthalate, benzylbutyl phthalate, diphenyl phthalate, diethyl naphthalene dicarboxylate, and dibutyl naphthalene dicarboxylate.

It is effective to react the magnesium compound with the organic carboxylic acid ester in an appropriate hydrocarbon solvent. Here, the hydrocarbon solvent only serves as a dispersant without participating in the reaction. Examples of the hydrocarbon solvent may include alicyclic hydrocarbons such as pentane, hexane, heptane, octane, decane, dodecane and kerosene. As described above, in order to obtain a catalyst having a uniform particle diameter, the magnesium compound may be dissolved in an appropriate solubilizer before reaction with the organic carboxylic acid ester. Examples of the solubilizer may include alcohol, organic carboxylic acid, aldehyde, and amine. Here, the dissolution of the magnesium compound in the solubilizer may be carried out at a temperature of about 80° C. to about 200° C. for about 30 minutes to about 3 hours, although the dissolution temperature and time may vary depending on the kind of solubilizer. The solubilizer may be used in an amount of about 0.1 mol or more, preferably about 1 mol or more, per 1 mol of the magnesium compound, although the amount of the solubilizer may vary depending on the kind thereof.

Specific examples of the solubilizer may include: alcohols including aliphatic alcohols such as 2-methylpentanol, 2-ethylbutanol, n-heptanol, n-octanol, 2-ethylhexanol, decanol, dodecanol and tetradecyl alcohol, alicyclic alcohols such as cyclohexanol and methylcyclohexanol, aromatic alcohols such as benzyl alcohol and methylbenzyl alcohol; organic carboxylic acids including caprylic acid, 2-ethylhexanoic acid and octanoic acid; aldehydes including caprylic aldehyde, 2-ethylhexyl aldehyde and octyl aldehyde; and amines including heptylamine, octylamine, decylamine, and 2-ethylhexylamine.

The catalyst obtained by the aforementioned method and having the aforementioned properties has a substantially spherical particle shape and a specific surface area of about 100 $m^2/g$ to about 1,000 $m^2/g$. In addition, solid catalyst particles are substantially uniform in size and have an average particle diameter of 1 μm to about 15 μm, for example, about 3 μm to about 10 μm. Further, the catalyst can retain at least 50% of an initial reactivity level (during the initial 30 minutes) for a period of time exceeding about 4 hours.

Advantageously, the polyethylene according to the present invention is used as a separator membrane for lithium ion batteries.

A polyethylene preparation method according to the present invention includes polymerizing ethylene in the presence of the catalyst set forth above. In one embodiment, the polyethylene may be prepared by mixing the catalyst with a promoter in a reactor, heating the reactor, introducing hydrogen into the reactor, and adding and polymerizing the ethylene. In one embodiment, the molecular weight of the polyethylene may be controlled by adjusting the input of hydrogen. In one embodiment, the input of hydrogen may range from about 350 ppm to about 800 ppm, for example, from about 400 ppm to about 750 ppm. Within this range, the polyethylene can have a molecular weight suitable for use as a separator membrane. In another embodiment, the input of hydrogen may range from about 450 ppm to about 500 ppm.

The promoter may include a material having at least one M-C bond (wherein M is any one of metals in Groups I to III in the periodic table) per molecule. Examples of the promoter may include: trialkyl aluminums such as triethyl aluminum and tributyl aluminum; trialkenyl aluminum, such as triisoprenyl aluminum; dialkyl aluminum alkoxides, such as diethyl aluminum ethoxide and dibutyl aluminum butoxide; dialkyl aluminum alkoxides, such as diethyl aluminum ethoxide and dibutyl aluminum butoxide; alkyl aluminum sesquialkoxides, such as ethyl aluminum sesquiethoxide and butyl aluminum sesquibutoxide; dialkyl aluminum hydrides, such as diethyl aluminum hydride and dibutyl aluminum hydride; alkyl aluminum dihydrides, such as ethyl aluminum dihydride and propyl aluminum dihydride; alkyl aluminum alkoxy halides, such as ethyl aluminum ethoxychloride, ethyl aluminum butoxychloride, and ethyl aluminum ethoxybromide.

The polyethylene may have a melt flow index of about 0.4 g/10 min to about 0.6 g/10 min, a weight average molecular weight of about 500,000 g/mol to about 700,000 g/mol, and a molecular weight distribution of about 3 to about 5. For example, the polyethylene may have a melt flow index of about 0.40 g/mol, 0.41 g/mol, 0.42 g/mol, 0.43 g/mol, 0.44 g/mol, 0.45 g/mol, 0.46 g/mol, 0.47 g/mol, 0.48 g/mol, 0.49 g/mol, 0.50 g/mol, 0.51 g/mol, 0.52 g/mol, 0.53 g/mol, 0.54 g/mol, 0.55 g/mol, 0.56 g/mol, 0.57 g/mol, 0.58 g/mol, 0.59 g/mol, or 0.60 g/mol. In particular, the polyethylene prepared using the catalyst secures uniformity of a molded article fabricated therefrom, has a heat capacity of about 180 J/g or less, and thus can exhibit a high crystal relaxation rate when heated, thereby having improved shutdown properties.

Next, the present invention will be described in more detail with reference to examples. However, it should be noted that these examples are provided for illustration only and should not be construed in any way as limiting the invention.

In addition, description of details apparent to those skilled in the art will be omitted for clarity.

EXAMPLE

Example 1

A support and a catalyst were prepared as follows. First, into a 2 L pressure-resistant glass reactor equipped with an SUS stirrer and an oil circulation heater, 90 g of magnesium chloride, 387 ml of decane, and 502 ml of ethylhexanol were introduced under a nitrogen atmosphere, followed by stirring at 300 rpm at 80° C. Then, the reactor was heated to 135° C. to completely dissolve the magnesium compound. After the solution became homogeneous, the solution was subjected to aging for 1 hour, followed by addition of 27 ml of an ethyl benzoate solution over a period of 30 minutes. Then, the resulting product was subjected to aging at 135° C. for 1 hour, followed by reducing the temperature of the reactor to 25° C., thereby preparing a magnesium compound solution.

In addition, 2-ethyl-1-hexanol was added to decane at 80° C., followed by heating to 140° C. to sufficiently dissolve the 2-ethyl-1-hexanol, and then diisobutyl phthalate (DIBP) was added subsequent to cooling to 20° C., thereby preparing a solution. Then, $TiCl_4$ and hexane at −15° C. were added to the solution, which, in turn, was slowly added dropwise to the magnesium compound solution, thereby forming seeds. Then, the reactor was heated to 74° C. to increase the sizes of the seeds, thereby forming catalyst particles. Then, aging was performed at 74° C. for 2 hours, followed by hexane washing 5 times subsequent to cooling to 40° C., thereby removing unreacted materials and residual titanium (Ti).

Evaluation of reactivity of the catalyst was carried out by measuring the change in amount of ethylene used in polymerization when introducing 10 mg of the catalyst into a 2 L reactor under conditions of a temperature of 80° C., a pressure of 7 bar, and a hydrogen pressure of 2.2 bar. Here, graph integration was carried out using a UTO SYSTEM DATA Dather II program, and the flow rate of ethylene was measured using a mass flow meter (5850E, BROOKS Instruments). Results are shown in FIG. 1. As shown in FIG. 1, it can be seen that the catalyst could retain at least about 50% of an initial reactivity level (during the initial 30 minutes) for a period of time exceeding about 4 hours.

Detailed polyethylene polymerization conditions were as follows. Into a 2 L autoclave reactor purged with $N_2$, hexane (1,000 ml) as a solvent was placed, followed by introducing triethyl aluminum (TEAL) (2 ml, 2 mmol) as a promoter to remove water from the hexane. The catalyst (1 g) was diluted with decane (100 ml) to prepare a catalyst slurry (lcc), which, in turn, was introduced into the reactor. Then, a valve of the reactor was closed, followed by heating the reactor to 80° C. When the temperature of the reactor reached 70° C., $H_2$ was introduced into the reactor, and, when the temperature of the reactor reached 80° C., ethylene was introduced into the reactor at a constant rate. Here, the reaction time was 2 hours in total and the pressure of the reactor was maintained at 8.0 bar. After completion of the reaction, the temperature of the reactor was reduced to room temperature. When the temperature of the reactor dropped below 30° C., a vent valve was opened slowly to reduce the internal pressure of the reactor to normal pressure. When the internal pressure of the reactor reached normal pressure, the reactor was disassembled, thereby obtaining a reaction product (PE) sample. Then, filtration was carried out using a filter paper to remove hexane from the sample, thereby collecting only polyethylene from the sample, followed by drying in a vacuum oven at 60° C. for 1 hour. As a result, a material shown in Table 1 was obtained. Here, the input of hydrogen was adjusted to 450 ppm for the purpose of molecular weight control.

Comparative Example 1

A polyethylene was prepared in the same manner as in Example 1 except that the input of hydrogen was adjusted to 250 ppm in the polymerization process.

Comparative Example 2

A polyethylene was prepared in the same manner as in Example 1 except that the input of hydrogen was adjusted to 830 ppm in the polymerization process.

Comparative Example 3

Solid magnesium chloride was added to a hexane solution at 20° C. to form a slurry, followed by swelling by adding ethanol to the slurry. Thereafter, diethylaluminum chloride (DEAC) was added to remove ethanol coupled to magnesium and then $TiCl_4$ was added to be supported on the magnesium. Washing was carried out in the same manner as in Example 1, thereby obtaining a catalyst. Evaluation of reactivity of the catalyst was carried out by measuring the decrement of ethylene used in polymerization when using 10 mg of the catalyst under conditions of a temperature of 80° C., a pressure of 7 bar, and a hydrogen pressure of 2.2 bar. Results are shown in FIG. 1. It can be seen that the catalyst retained at least about 50% of an initial reactivity level (during the initial 30 minutes) for a period of time less than about 1.5 hours.

A polyethylene was prepared using the catalyst. Here, the input of hydrogen was adjusted to 250 ppm for the purpose of molecular weight control.

Comparative Example 4

A polyethylene was prepared in the same manner as in Example 1 except that the catalyst of Comparative Example 3 was used and the input of hydrogen was adjusted to 450 ppm in the polymerization process.

Comparative Example 5

A polyethylene was prepared in the same manner as in Example 1 except that the catalyst of Comparative Example 3 was used and the input of hydrogen was adjusted to 830 ppm in the polymerization process.

Property Evaluation (1) Melt flow index (g/10 min): The melt flow index of each of the polyethylene samples prepared in Example 1 and Comparative Examples 1 to 5 was measured at 190° C. under a load of 21.6 kg in accordance with ASTM D1238.

(2) Weight average molecular weight and molecular weight distribution: The weight average molecular weight of each of the polyethylene samples prepared in Example 1 and Comparative Examples 1 to 5 was measured by gel permeation chromatography (GPC) and the molecular weight distribution was calculated as a ratio of weight average molecular weight to number average molecular weight of the sample (Mw/Mn).

(3) Average particle diameter (μm): The average particle diameter of each of the polyethylene samples prepared in Example 1 and Comparative Examples 1 to 5 was measured by laser spectroscopy.

(4) Heat capacity: The heat capacity of each of the polyethylene samples prepared in Example 1 and Comparative Examples 1 to 5 was measured by differential scanning calorimetry (DSC) and 3-step analysis was employed under conditions of a temperature of 200° C. and a heating rate of 10° C./min.

(5) Apparent density: The apparent density of each of the polyethylene samples prepared in Example 1 and Comparative Examples 1 to 5 was measured in accordance with ASTM D1895.

TABLE 1

| | | Unit | | | | | |
|---|---|---|---|---|---|---|---|
| | | Input of hydrogen (ppm) | Melt flow index (g/10 min) | Weight average molecular weight (kg/mol) | Molecular weight distribution | Average particle diameter (μm) | Heat capacity (J/g) | Apparent density (g/cc) |
| Example 1 | | 450 | 0.49 | 602.9 | 3.56 | 127 | 175.8 | 0.48 |
| Comparative | 1 | 250 | 0.16 | 756.6 | 3.45 | 116 | 176.4 | 0.47 |
| Example | 2 | 830 | 1.72 | 411.4 | 4.12 | 142 | 175.2 | 0.47 |
| | 3 | 250 | 0.15 | 765.7 | 4.41 | 205 | 193.1 | 0.41 |
| | 4 | 450 | 0.51 | 612.6 | 4.56 | 213 | 195.2 | 0.42 |
| | 5 | 830 | 1.80 | 402.3 | 4.84 | 211 | 191.7 | 0.41 |

From the results shown in Table 1, it can be seen that the polyethylene prepared in Example 1 had a molecular weight distribution, average particle diameter and heat capacity optimized for a separator membrane.

Although some embodiments have been described herein, it should be understood that various modifications, variations, and alterations can be made by those skilled in the art without departing from the spirit and scope of the present invention. Therefore, it should be understood that the foregoing embodiments are provided for illustration only and are not to be in any way construed as limiting the present invention.

What is claimed is:

1. A polyethylene having a melt flow index of about 0.4 g/10 min to about 0.6 g/10 min, as measured at a temperature of 190° C. and under a load of 21.6 kg, a weight average molecular weight of about 500,000 g/mol to about 700,000 g/mol, and a molecular weight distribution of about 3 to about 5, wherein the polyethylene is prepared by polymerization in the presence of a catalyst retaining at least about 50% of an initial reactivity level (during initial 30 minutes) for a period of time exceeding about 4 hours.

2. The polyethylene according to claim 1, wherein the catalyst is a Ziegler-Natta catalyst in which a titanium compound is supported on a magnesium support.

3. The polyethylene according to claim 1, wherein the polyethylene has a melting transition heat capacity of about 180 J/g or less, as measured by differential scanning calorimetry, and an average particle diameter of about 80 μm to about 180 μm.

4. A method of preparing the polyethylene according to claim 1, the method comprising:
polymerizing ethylene in the presence of the catalyst retaining at least about 50% of the initial reactivity level (during initial 30 minutes) for the period of time exceeding about 4 hours.

5. The method according to claim 4, wherein a molecular weight of the polyethylene is controlled by adjusting an input of hydrogen in a range of about 350 ppm to about 800 ppm.

6. The method according to claim 4, wherein the catalyst is a Ziegler-Natta catalyst in which a titanium compound is supported on a magnesium support.

7. A separator membrane comprising the polyethylene according to claim 1.

8. The separator membrane according to claim 7, wherein the separator membrane is for lithium ion batteries.

\* \* \* \* \*